United States Patent
Cho (10) Patent No.: US 8,090,154 B2
(45) Date of Patent: Jan. 3, 2012

(54) VIDEO PROCESSING APPARATUS AND VIDEO PROCESSING METHOD THEREOF

(75) Inventor: Hyeung-rae Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 826 days.

(21) Appl. No.: 12/180,833

(22) Filed: Jul. 28, 2008

(65) Prior Publication Data

US 2009/0136151 A1 May 28, 2009

(30) Foreign Application Priority Data

Nov. 28, 2007 (KR) ........................ 10-2007-0122234

(51) Int. Cl.
*G06K 9/00* (2006.01)
(52) U.S. Cl. ............... 382/107; 375/240.12; 375/240.13; 375/240.14; 375/240.15; 375/240.16
(58) Field of Classification Search ................... 382/100, 382/104, 236, 238, 275; 348/E7.078, E5.066, 348/E5.11, 222.1, 905, 452, 448; 375/240.23, 375/E7.194, E7.211, 240.12–240.16, 240.24
See application file for complete search history.

(56) References Cited

U.S. PATENT DOCUMENTS

| 2001/0004385 A1* | 6/2001 | Okumura et al. ........ 375/240.16 |
| 2002/0037050 A1* | 3/2002 | Ishikawa ................. 375/240.13 |
| 2005/0122426 A1 | 6/2005 | Winger et al. |

FOREIGN PATENT DOCUMENTS

| EP | 0 535 746 A2 | 4/1993 |
| EP | 1 589 764 A2 | 10/2005 |

* cited by examiner

*Primary Examiner* — Atiba O Fitzpatrick
(74) *Attorney, Agent, or Firm* — Sughrue Mion, PLLC (57) ABSTRACT

There are provided a video processing apparatus and a video processing method. The video processing apparatus includes a first motion correcting part which divides a video frame into blocks of a predetermined unit and corrects a motion with respect to at least some area of a present frame by using a motion vector of an adjacent block adjacent to the present block, a second motion correcting part which corrects the motion by using a motion vector of an adjacent frame adjacent to the present frame, and a controller which controls the first motion correcting part to correct the motion if the number of the adjacent blocks on which a video can be displayed is not smaller than a predetermined value, and controls the second motion correcting part to correct the motion if the number of the adjacent blocks on which the video can be displayed is smaller than the predetermined value.

9 Claims, 7 Drawing Sheets

VIDEO PROCESSING APPARATUS AND VIDEO PROCESSING METHOD THEREOF

CROSS-REFERENCE TO RELATED APPLICATION

This application claims priority from Korean Patent Application No. 10-2007-0122234, filed on Nov. 28, 2007 in the Korean Intellectual Property Office, the disclosure of which is incorporated herein by reference in its entirety.

BACKGROUND OF INVENTION

1. Field of Invention

Apparatuses and methods consistent with the present invention relate to a video processing apparatus and a video processing method of the same, and more particularly, to a video processing apparatus which performs motion correction for a video frame, and a video processing method of the same.

2. Description of Related Art

In general, a video processing apparatus performs video processing for a video signal to output a displayable video. The video processing apparatus performs video processing for a video signal including a predetermined video received from a broadcasting station, or a video signal inputted from various video devices such as a DVD.

The video processing apparatus sequentially displays a plurality of unit videos included in the video signal, that is, a plurality of frames. However, since the video processing apparatus has a limited number of frames to display per unit time, in the case that a video includes an object with a quick movement, a user may not perceive the movement of the object to be natural. Accordingly, the conventional video processing apparatus performs a Frame Rate Conversion (FRC) for converting a frame rate, a Movie Judder Cancellation (MJC) for dividing a frame into a predetermined unit of blocks and estimating a motion by using a motion vector of an adjacent block adjacent to an arbitrary block, and so on, to display a corrected frame.

However, a conventional video processing apparatus using the MJC algorithm has a problem in that motion correction cannot be accurately performed due to the lack of the number of adjacent blocks on side edges of a screen to cause a halo phenomenon around the object. To solve such a problem, the conventional video processing apparatus performs over-scanning so that side edges of a screen are not displayed, but there has been an increasing desire to watch full-scan video.

SUMMARY OF INVENTION

Accordingly, it is an aspect of the present invention to provide a video processing apparatus which can perform motion correction by using an adjacent frame with respect to an area having a small number of adjacent blocks to thereby display a video having an improved quality, and a video processing method thereof.

Another aspect of the present invention is to provide a video processing apparatus which can control the size of an area where the motion correction is performed by using the adjacent frame to thereby efficiently process a video, and a video processing method thereof.

Still another aspect of the present invention is to provide a video processing apparatus which can filter a border between the areas where the motion correction is performed by different algorithms to thereby naturally display the border between the areas where the motion correction is performed, and a video processing method thereof.

Yet another aspect of the present invention is to provide a video processing apparatus which can display an undistorted full-scan video, and a video processing method thereof.

Additional aspects of the present invention will be set forth in part in the description which follows and, in part, will be obvious from the description, or may be learned by practice of the present invention.

The foregoing and/or other aspects of the present invention can be achieved by providing a video processing apparatus, including: a first motion correcting part which divides a video frame into blocks of a predetermined unit, and corrects a motion with respect to at least some area of a present frame by using a motion vector of an adjacent block adjacent to the present block; a second motion correcting part which corrects the motion by using a motion vector of an adjacent frame adjacent to the present frame; and a controller which controls the first motion correcting part to correct the motion if the number of the adjacent blocks on which a video can be displayed is not smaller than a predetermined value, and controls the second motion correcting part to correct the motion if the number of the adjacent blocks on which the video can be displayed is smaller than the predetermined value.

The second motion correcting part may perform a Motion Adaptive De-interlace (MAD) to correct the motion.

The controller may control to perform the motion correction with respect to a block corresponding to a side edge of the present frame.

The controller may control the second motion correcting part to correct the motion only with respect to a block of one side edge where a motion of an object begins.

The size of the block may be controlled.

The controller may perform filtering with respect to a border between an area where the motion correction is performed by the first motion correcting part and an area where the motion correction is performed by the second motion correcting part.

At least one of the first motion correcting part and the second motion correcting part may correct the motion by a difference of absolute values of pixels on the same position inside the block.

The controller may determine whether or not the video can be displayed with respect to eight blocks adjacent to the present block.

The video displayed by the motion correction may be provided as a full-scan video.

The foregoing and/or other aspects of the present invention can be also achieved by providing a video processing method of a video processing apparatus, including: calculating the number of adjacent blocks on which a video can be displayed among blocks adjacent to a present block among blocks into which a video frame is divided; determining whether or not the number of the adjacent blocks on which the video can be displayed is smaller than a predetermined value; correcting a motion with respect to at least some area of a present frame by using a motion vector of the adjacent blocks if the number of the adjacent blocks on which the video can be displayed is not smaller than the predetermined value; and correcting the motion by using a motion vector of a frame adjacent to the present frame if the number of the adjacent blocks on which the video can be displayed is smaller than the predetermined value.

In the correcting the motion, there may be performed an MAD with respect to the present block in which the number of the adjacent blocks is smaller than the predetermined value.

In the correcting the motion, the motion may be corrected with respect to the block corresponding to the brink of the present frame.

In the correcting the motion, the motion may be corrected only with respect to a block of one side edge where a motion of an object begins by using the motion vector of the adjacent frame.

The size of the block may be controlled.

The correcting the motion may include performing filtering with respect to a border between an area where the motion correction is performed by using the motion vector of the adjacent blocks and an area where the motion correction is performed by using the motion vector of the adjacent frame.

In the correcting the motion, the motion may be corrected by a difference of absolute values of pixels on the same position inside the block.

In the determining whether or not the number of the adjacent blocks on which the video can be displayed is smaller than the predetermined value, there may be determined whether or not the video can be displayed with respect to eight blocks adjacent to the present block.

The video displayed by the motion correction may be provided as a full-scan video of an input video signal.

BRIEF DESCRIPTION OF DRAWINGS

The above and/or other aspects of the present invention will become apparent and more readily appreciated from the following description of exemplary embodiments, taken in conjunction with the accompanying drawings, in which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to like elements throughout. The exemplary embodiments are described below so as to explain the present invention by referring to the figures.

Figure 1:
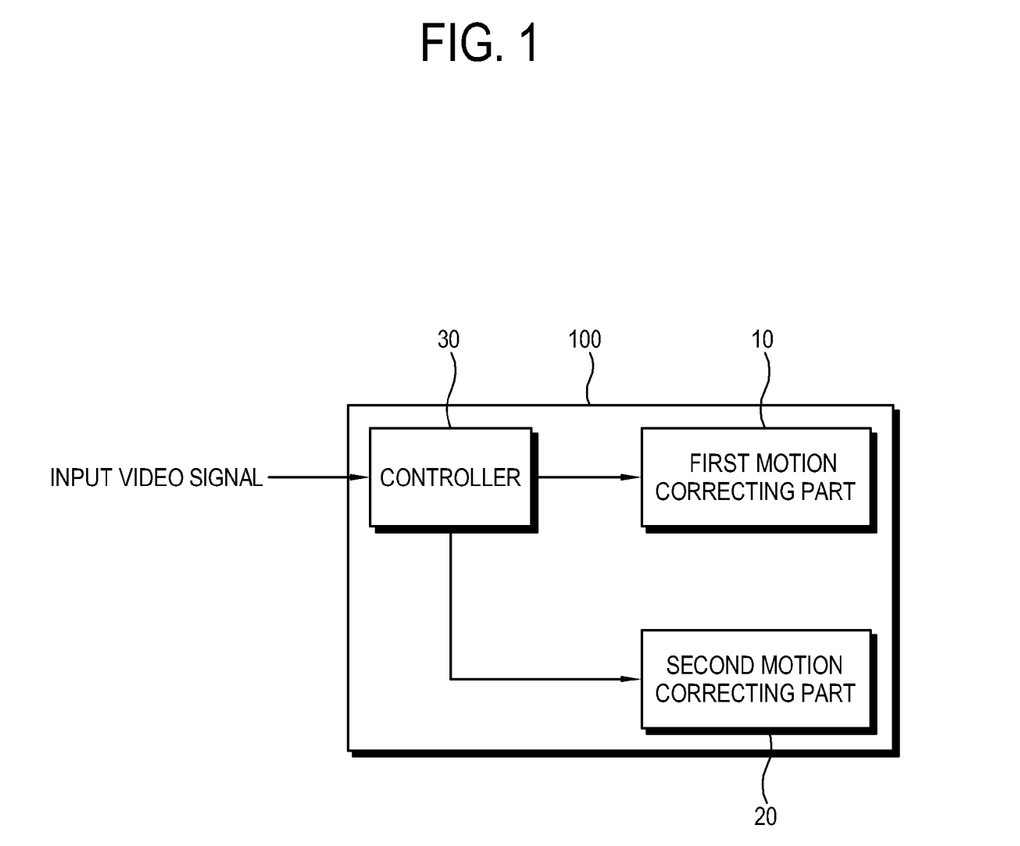
FIGS. 1 and 2A are block diagrams illustrating a video processing apparatus according to an exemplary embodiment of the present invention.

Referring to FIG. 1, a video processing apparatus 100 includes a first motion correcting part 10, a second motion correcting part 20, and a controller 30. The video processing apparatus 100 may be provided as a set-top box separated from a display module, but it may be provided in an integrated form in which a display part is included.

The first motion correcting part 10 divides a video frame into blocks of a predetermined unit, and corrects a motion with respect to at least some area of the present frame by using a motion vector of an adjacent block adjacent to the present block. The first motion correcting part 10 performs an MJC algorithm for calculating a proper motion vector with respect to the present block on the basis of a motion vector obtained from eight blocks adjacent to the present block.

Figure 2A:
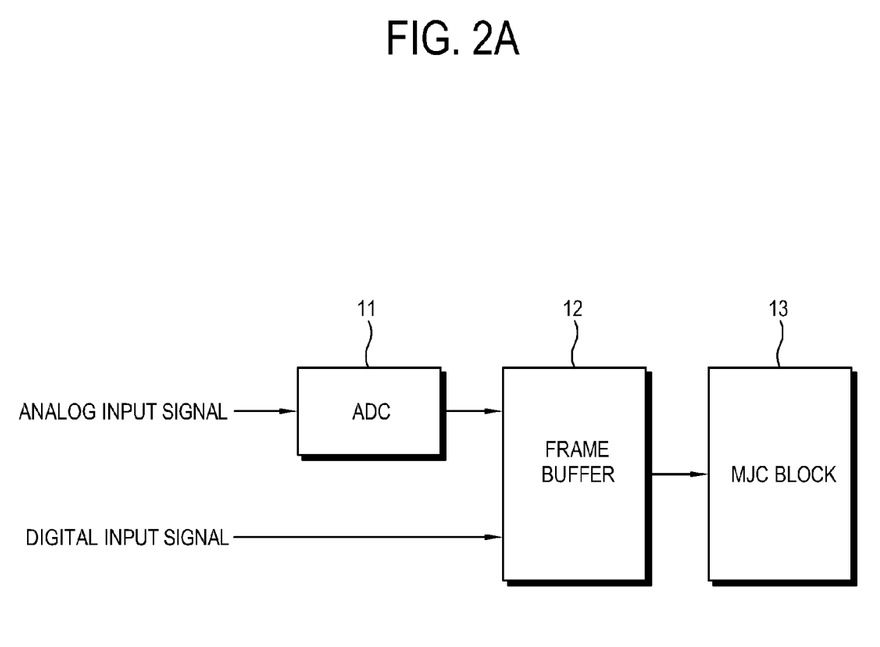

As shown in FIG. 2A, the video processing apparatus 100 according to the present invention inputs a digital signal converted through an ADC (analog to digital converter) 11 into a frame buffer 12 if an analog signal is inputted. The frame buffer stores the inputted video signal. The digital signal is directly inputted into the frame buffer, and the MJC algorithm is performed in an MJC block 13 with respect to the video signal stored in the frame buffer.

Figure 2B:
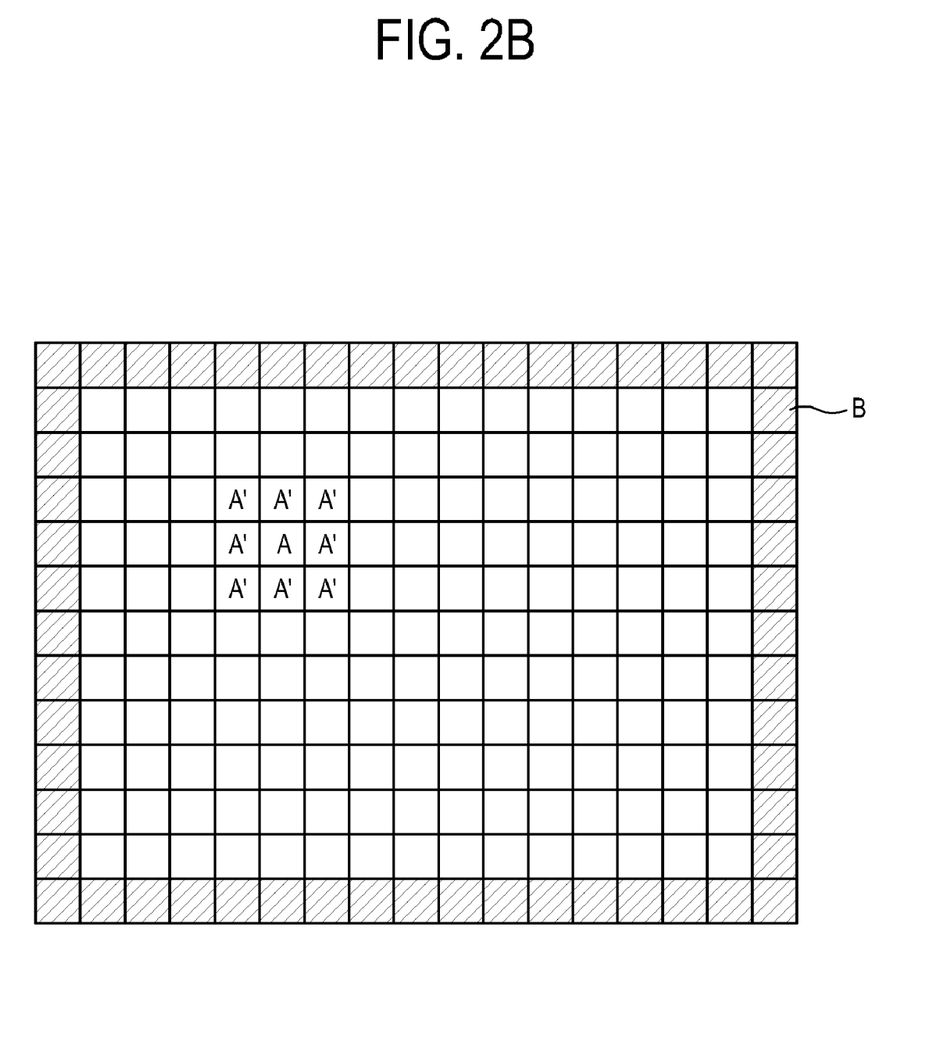
FIG. 2B illustrates a process of performing motion correction in the video processing apparatus according to exemplary embodiments of the present invention.

FIG. 2B is a drawing for illustrating the MJC algorithm. The MJC algorithm divides one frame into a predetermined size of blocks, and calculates a proper motion vector with the present block A on the basis of the motion vector obtained from the eight adjacent blocks (A') adjacent to the present block A to perform motion correction.

The second motion correcting part 20 performs motion correction by using the motion vector of the adjacent frame adjacent to the present frame. The second motion correcting part 20 may generate a new frame with respect to an interlace signal on the basis of the present frame and the preceding frame prior to the present frame to perform an MAD algorithm for converting the new frame into a progressive signal. The second motion correcting part 20 performs a 3-D interlace with respect to a still image, and a 2-D interlace with respect to a video.

Of course, since there is no need to perform the IPC (Interlace to Progressive Conversion) if the input signal is a progressive signal, the second motion correcting part 20 bypasses the input video signal by control of the controller 30 if the progressive signal is inputted.

Here, the first motion correcting part 10 and the second motion correcting part 20 estimate a motion vector with respect to a block of which the motion is to be estimated (hereinafter, referred to as "the present block") of the present frame and perform the motion correction according to the sum of an absolute difference (SAD) according to the result.

The controller 30 controls the first motion correcting part 10 to correct the motion if the number of the adjacent blocks on which the video can be displayed among the adjacent blocks adjacent to the present block is not smaller than a predetermined value, and controls the second motion correcting part 20 to correct the motion if the number of the adjacent blocks on which the video can be displayed is smaller than the predetermined value.

The controller 30 divides one frame into blocks in the size of 8×8, and calculates the number of blocks on which the video can be displayed with respect to eight blocks adjacent to the present block. Accordingly, if the number of the adjacent blocks on which the video can be displayed is three or five, for example, if the present block is located on the side edges of the screen, the controller 30 controls the second motion correcting part 20 to correct the motion by using the adjacent frame, and if the number of the adjacent blocks on which the video can be displayed is eight, the controller 30 controls the first motion correcting part 10 to correct the motion. Thus, the full-scan video for displaying the entire inputted video can be displayed without an error.

The controller 30 may set the motion vector of the adjacent block as a zero vector, that is, zero (0,0) if the number of the adjacent blocks on which the video can be displayed is smaller than the predetermined value.

Figure 3:
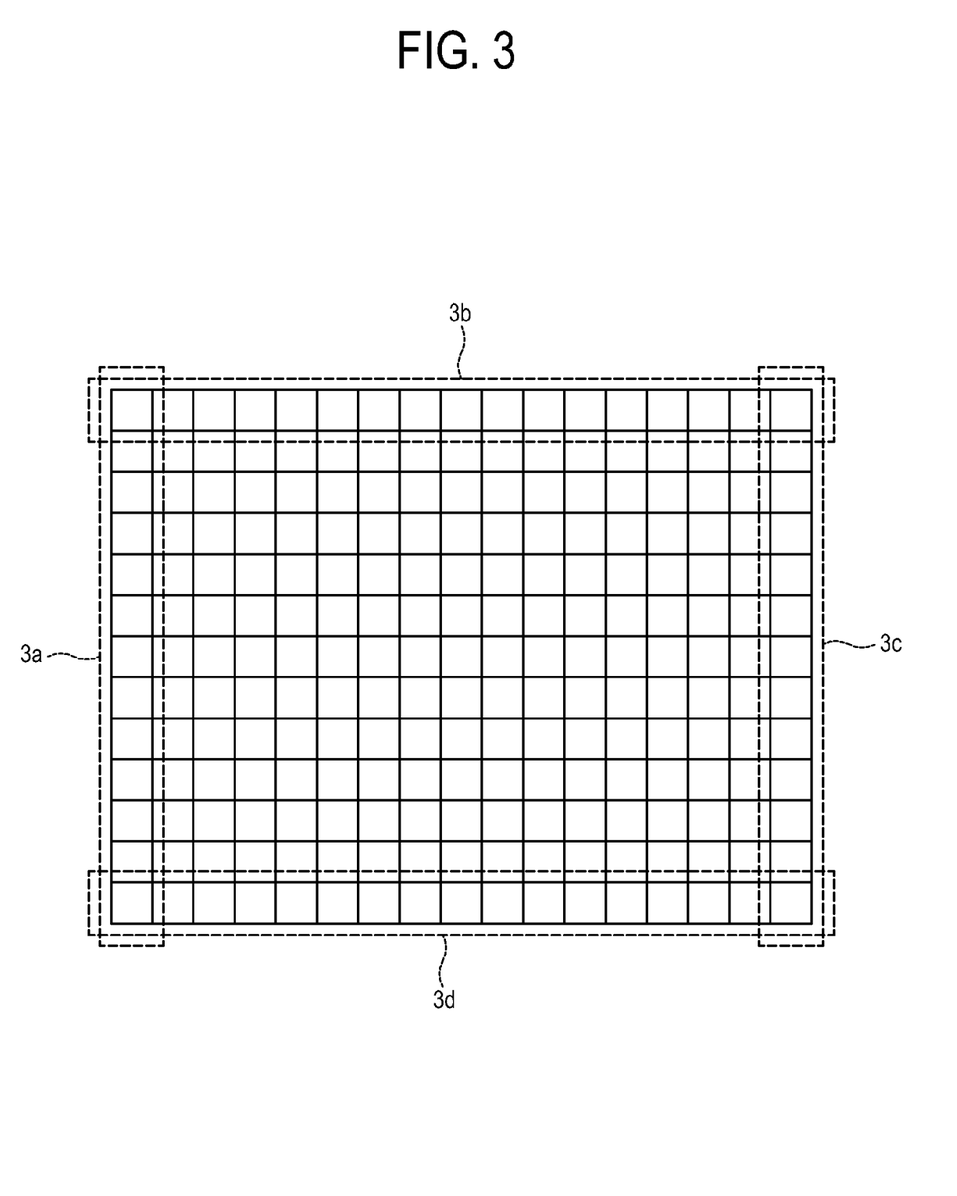
FIG. 3 is a block diagram illustrating a video processing apparatus according to another exemplary embodiment of the present invention.

FIG. 3 illustrates a process in which the controller 30 sets an area where the number of the adjacent blocks on which the video can be displayed is smaller than the predetermined value. As shown in FIG. 3, the controller 30 controls the first motion correcting part 10 not to operate and controls the second motion correcting part 20 to perform motion correction, with respect to four areas of 3a, 3b, 3c and 3d.

Here, the controller 30 can control each size of the four areas 3a through 3d. Thus, errors which may be generated through the motion correction by the first motion correcting part 10 can be reduced.

Also, the controller 30 may determine whether the first motion correcting part 10 will correct the motion or the second motion correcting part 20 will correct the motion with respect to the present block according to the motion of the object.

Figure 4:
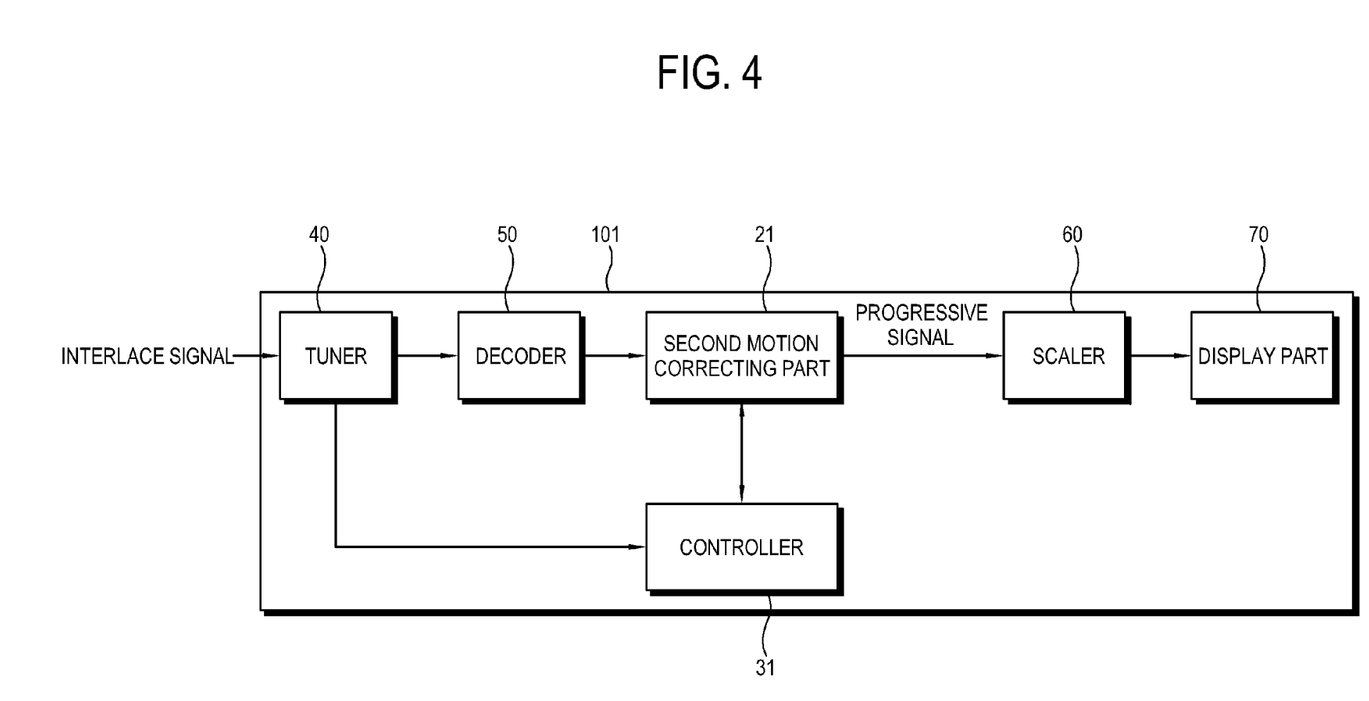
FIG. 4 illustrates an example in which the video processing apparatus according to exemplary embodiments of the present invention performs motion correction using adjacent blocks.

FIG. 4 is a block diagram illustrating another exemplary embodiment of the video processing apparatus 101 according to the present invention. As shown in FIG. 4, the video processing apparatus 101 may include a second motion correcting part 21, a controller 31, a tuner 40, a decoder 50, a scaler 60, and a display part 70.

The tuner 40 receives a video signal having a frequency band corresponding to a predetermined channel selected by a user with respect to a broadcast video signal.

The decoder 50 performs decoding for the received video signal according to a predetermined standard and extracts brightness information, color information, horizontal sync information, and vertical sync information, etc. of the video.

The second motion correcting part 21 performs de-interlacing for converting the inputted interlace signal into a progressive signal, and may properly perform weaving and blending according to characteristics of the video.

The scaler 60 performs video processing so that the video signal of which the motion has been corrected by the second motion correcting part 21 can be displayed in a proper size and position.

The display part 70 displays a video on the basis of the signal processed by the scaler 60.

Figure 5:
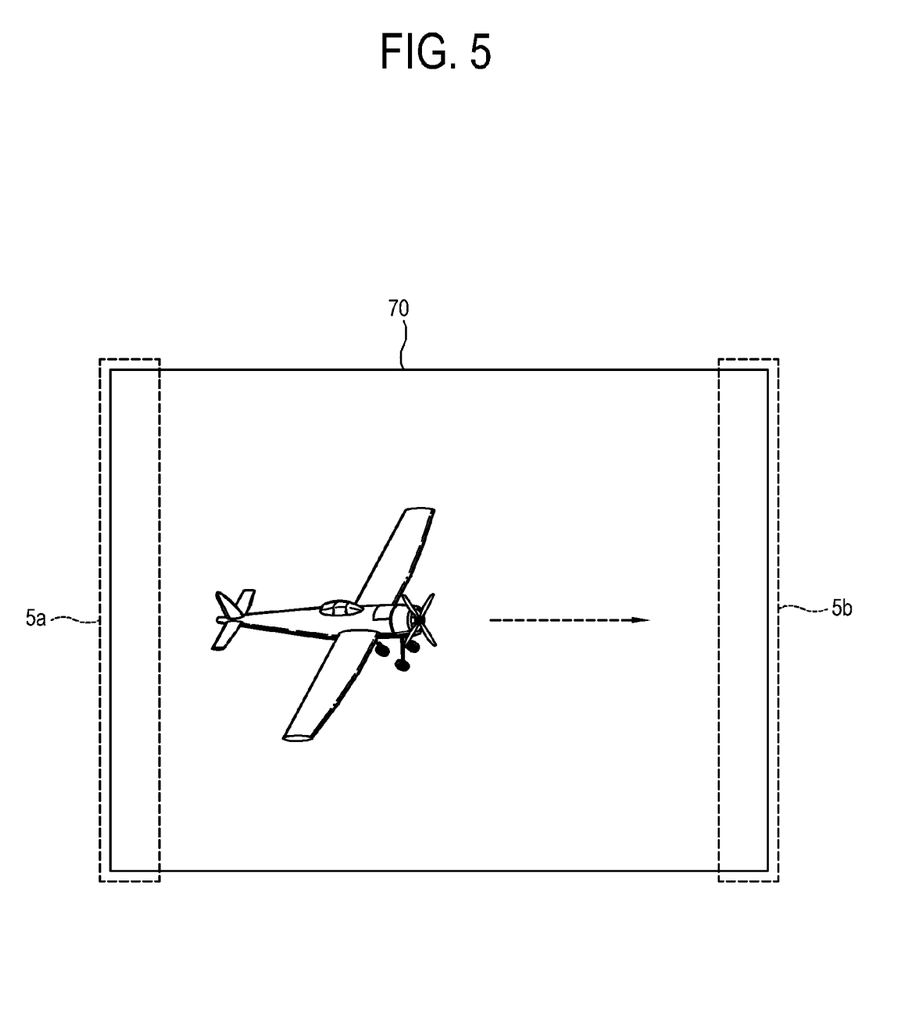
FIG. 5 illustrates another example in which the video processing apparatus according to exemplary embodiments of the present invention performs motion correction using adjacent blocks.

As shown in FIG. 5, the controller 30 (31) may control the second motion correcting part 20 (21) in place of the first motion correcting part 10 to correct the motion only with respect to an area 5a, that is, an area where the motion of the object begins if the object moves from left to right. That is because an area 5b where the motion of the object ends has no influence on the motion correction with respect to the block displayed on the screen even in the case that there is a lack of information on the adjacent blocks.

Meanwhile, the controller 30 (31) may filter a border between the area where the first motion correcting part 10 corrects the motion and the area where the second motion correcting part 20 (21) corrects the motion so that the video can be naturally displayed.

In other words, the controller 30 (31) may calculate the brightness of right-left pixels or up-down pixels of the border between the areas where the motion correction has been performed by the first motion correcting part 10 and the second motion correcting part 20 (21), calculate an average value of the calculated brightness, and set the brightness of the border pixels from the calculated average value, to thereby filter the border between the areas.

Figure 6:
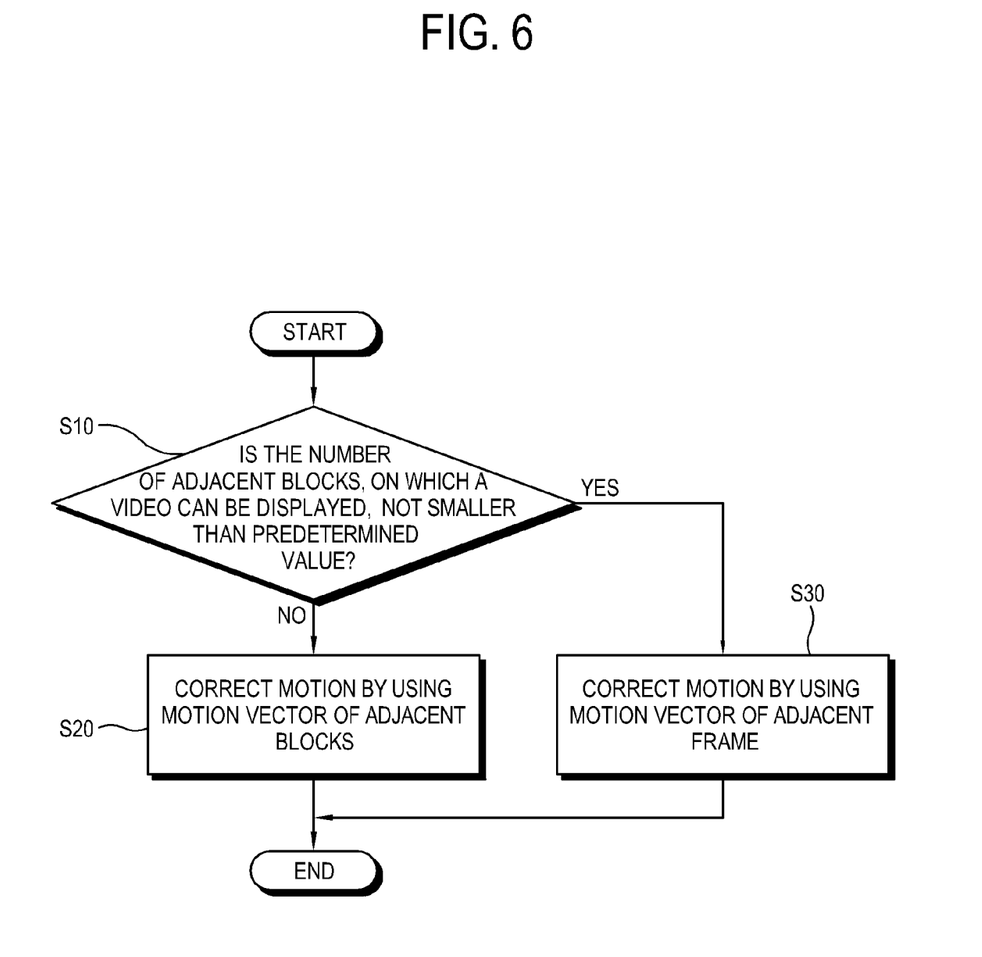
FIG. 6 is a flow diagram illustrating a video processing method according to an exemplary embodiment of the present invention.

Hereinafter, a video processing method according to the present invention will be described by referring to FIG. 6.

First, the controller 30 (31) calculates the number of adjacent blocks on which a video can be displayed, adjacent to the present block among blocks into which the video frame has been divided. Here, the controller 30 (31) divides one frame into blocks in the size of 8×8, and calculates the number of the blocks on which the video can be displayed with respect to the eight blocks adjacent to the singular present block.

Next, if the number of the adjacent blocks on which the video can be displayed is not smaller than the predetermined value (S10—NO), the controller 30 (31) controls the first motion correcting part 10 to correct the motion with respect to at least some area of the present frame by using the motion vector of the adjacent blocks (S20).

If the number of the adjacent blocks on which the video can be displayed is smaller than the predetermined value (S10—YES), the controller 30 controls the second motion correcting part 20 (21) to correct the motion by using the motion vector of the frames adjacent to the present frame (S30).

Here, the motion is corrected by the MAD algorithm for generating a new frame on the basis of the present invention and the preceding frame prior to the present frame with respect to an interlace signal to convert the new frame into a progressive signal, and the second motion correcting part 20 (21) performs the 3-D interlace with respect to the still image and performs the 2-D interlace with respect to a video.

In addition, in the operation S30, the motion may be corrected with respect to the blocks corresponding to the side edges of the present frame. Here, the motion may be corrected only with respect to blocks of one side edges where the motion of the object begins among the four side edges.

Also, the step S30 may further include performing filtering with respect to the border between the area where the motion correction is performed by using the motion vector of the adjacent blocks, that is, the area where the motion is corrected by the first motion correcting part 10 and the area where the motion is corrected by using the motion vector of the adjacent frame, that is, the area where the motion is corrected by the second motion correcting part 20 (21).

As described above, the video processing apparatus and the video processing method according to exemplary embodiments of the present invention can perform motion correction with respect to areas with a small number of adjacent blocks by using an adjacent frame, to thereby display a video having an improved quality.

Also, the video processing apparatus and the video processing method according to exemplary embodiments of the present invention can control the size of an area where motion correction is performed by using an adjacent frame, to thereby efficiently process a video.

In addition, the video processing apparatus and the video processing method according to exemplary embodiments of the present invention can filter a border between areas where motion correction is performed by different algorithms, to thereby naturally display the border.

Also, the video processing apparatus and the video processing method according to exemplary embodiments of the present invention can display an undistorted full-scan video.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A video processing apparatus, comprising:
a first motion correcting part which corrects a motion with respect to first areas of a present frame by using a motion vector of an adjacent block which is adjacent to a respective present block of the present frame, wherein the present frame is divided into blocks of a predetermined unit;

a second motion correcting part which corrects a motion with respect to second areas of the present frame by using a motion vector of an adjacent frame which is adjacent to the present frame; and a controller which controls the first motion correcting part to correct the motion with respect to the first areas of the present frame in which a number of adjacent blocks on which a video can be displayed is not smaller than a predetermined value, and controls the second motion correcting part to correct the motion with respect to the second areas of the present frame in which the number of adjacent blocks on which the video can be displayed is smaller than the predetermined value.

2. The video processing apparatus according to claim 1, wherein the second motion correcting part performs a Motion Adaptive De-interlace (MAD) to correct the motion.

3. The video processing apparatus according to claim 1, wherein the controller controls the first motion correcting part to perform the motion correction with respect to a block corresponding to a side edge of the present frame.

4. The video processing apparatus according to claim 3, wherein the controller controls the second motion correcting part to correct the motion only with respect to a block of one side edge where a motion of an object begins.

5. The video processing apparatus according to claim 3, wherein a size of the blocks can be controlled.

6. The video processing apparatus according to claim 1, wherein the controller performs filtering with respect to a border between the first areas where the motion correction is performed by the first motion correcting part and the second areas where the motion correction is performed by the second motion correcting part.

7. The video processing apparatus according to claim 1, wherein at least one of the first motion correcting part and the second motion correcting part corrects a motion by a difference of absolute values of pixels on a same position inside the respective present block.

8. The video processing apparatus according to claim 1, wherein the controller determines whether or not the video can be displayed with respect to eight blocks adjacent to the respective present block.

9. The video processing apparatus according to claim 1, wherein video displayed by the motion correction is provided as a full-scan video.

* * * * *